United States Patent [19]
Sato et al.

[11] 3,964,223

[45] June 22, 1976

[54] WATERPROOF SHEET FOR AIRCRAFT CARGO CHAMBER

[75] Inventors: Takashi Sato, Chigasaki; Katuyuki Saita, Yokohama; Tadashi Naito, Hatano; Harumi Takeda, Yokohama, all of Japan

[73] Assignee: The Yokohama Rubber Co. Ltd., Tokyo, Japan

[22] Filed: June 13, 1975

[21] Appl. No.: 586,777

[52] U.S. Cl. ................................. 52/273; 52/179; 52/246; 52/509
[51] Int. Cl.² .......................................... E04B 5/00
[58] Field of Search ............ 52/273, 179, 506, 509, 52/510, 511, 512, 3, 246; 244/118 R; 105/423

[56] References Cited
UNITED STATES PATENTS

| | | | |
|---|---|---|---|
| 1,871,571 | 8/1932 | Weber | 52/3 |
| 2,263,919 | 11/1941 | Darragh | 52/204 X |
| 2,559,443 | 7/1951 | Kuhler | 52/273 X |
| 2,801,018 | 7/1957 | Yount | 105/423 X |
| 3,121,649 | 2/1964 | Oliver | 52/511 X |
| 3,480,321 | 11/1969 | Brandt et al. | 105/423 X |
| 3,486,723 | 12/1969 | Harrison | 244/118 R |
| 3,835,481 | 9/1974 | Engelhart et al. | 52/179 |
| 3,895,145 | 7/1975 | McPherson | 52/273 X |

FOREIGN PATENTS OR APPLICATIONS

222,295  9/1958  Australia................................ 52/179

*Primary Examiner*—Ernest R. Purser
*Assistant Examiner*—Leslie A. Braun
*Attorney, Agent, or Firm*—Sughrue, Rothwell, Mion, Zinn & Macpeak

[57] ABSTRACT

A waterproof sheet for a cargo chamber of an aircraft comprising a base sheet adapted to lie on the floor of the cargo chamber and having notched portions at positions corresponding to the doors of the cargo chamber; door sill flaps provided to the base sheet around the notched portions and adapted to be folded up and down at the time of opening and closing of the cargo chamber door; door sill protectors provided to the base sheet at the notched portions for protecting the door sill flaps; side sheets provided at the longitudinal sides of the base sheet and having tape fasteners for securing the side sheets to the wall of the cargo chamber, and end sheets provided at both longitudinal ends of the base sheet and the side sheets, the end sheets having tape fasteners for tucking them when the base and side sheets are properly positioned in the cargo chamber.

7 Claims, 6 Drawing Figures

WATERPROOF SHEET FOR AIRCRAFT CARGO CHAMBER

BACKGROUND OF THE INVENTION

1. Field of the Invention

The present invention relates to a waterproof sheet for aircraft cargo chambers and, more particularly to a waterproof sheet which is easy to attach to and detach from cargo chambers of airplanes, hard to break or wrinkle during the handling of the cargo, repeatedly usable, resistant to water when rinsed, able to protect cargo when the cargo is handled in the rain, and can be rolled up for storage.

2. Description of the Prior Art

Nowadays, the transporation of perishable fish by air is increasing rapidly, which leads to new problems including corrosion of the cargo chamber floor or the body of the airplane by water leaking from the cargo or entry of rainwater as a result of handling of the cargo in the rain.

Conventionally, as seen from FIG. 1, the floor 2 of the cargo chamber 1 of a plane is covered by plates of fiber reinforced plastic (FRP) or aluminium. The floor 2 is fixed to the stringers 3 of the plane body by bolts 4. The water eventually leaked from the cargo is likely to permeate the heat insulator 6 lying between the floor 2 and the outer plate 5 of the plane body, through, for example, the holes for bolts 4. The water is also likely to cause the corrosion of the outer plates 5 or stringers 3, especially when the water contains salt.

Hitherto, in order to prevent the water from permeating the heat insulator; sheets 7 of polyethylene of a thickness of about 0.5 mm are laid over the floor 2, and on which a layer of blotting paper 8 of a thickness of about 20 mm is provided on which the cargo 9 is put. However, this solution to the above-described problems is inconvenient in that (1) it is impossible to stop the water from leaking through the gap between adjacent polyethylene sheets 7, (2) it is impossible to prevent the water used in rinsing the chamber from leaking out during the rinsing, (3) and the layers of sheets must be replaced with new ones at each loading.

To avoid these problems, use of one piece of a rubber sheet having a thickness of about 1 mm in place of the polyethylene sheets 7 has been proposed. However, this solution also is insufficient in that (1) the sheet of rubber is likely to be wrinkled by the movement of the cargo, (2) the rubber sheet is very weak and can be used only two or three times, and (3) the protection against rain is insufficient.

SUMMARY OF THE INVENTION

Therefore, an object of the invention is to avoid the above described problems.

Another object of the invention is to provide a waterproof sheet for cargo chambers of airplanes which can be rolled for storage when it is not used, the waterproof sheet comprising a base sheet of a highly wear-resistant, impact-resistant, water-and fire-resistant flexible material, such as a synthetic rubber, with the base sheet having notched portions at a position corresponding to the door opening of the cargo chamber around which are provided door still flaps of a flexible material such as a synthetic rubber adapted to be folded and hung from the door opening to prevent water from reaching the floor of the cargo chamber thereby protecting the floor. The base sheet further includes door sill protectors of a wear-resistant, impact-resistant water-and fire-resistant flexible material, such as a synthetic resin, and adapted to protect the door sill flap around the notched portions. The waterproof sheet further comprises side sheets secured to the longitudinal sides thereof and end sheets secured to longitudinal ends thereof with, both the side sheets and end sheets being a flexible material such as a synthetic resin. The side sheets are provided with tape fasteners by which the side sheets can be secured to the body of the airplane and the end sheets are provided with tape fasteners by which the end sheets can be tucked or pleated.

Accordingly the invention provides a waterproof sheet for cargo chambers of aircraft comprising a base sheet adapted to lie on the floor of the cargo chamber and having notched portions at positions corresponding to the door openings of the cargo chamber; door still flaps provided to the base sheet around the notched portions and adapted to be folded up and down at the time of opening and closing of the door; door sill protectors provided to the base sheet at positions at the notched portions for protecting the door sill flaps; side sheets provided at the longitudinal sides of the base sheet and having tape fasteners by which the side sheets can be secured to the wall of the cargo chamber, and end sheets provided at both longitudinal ends of the base sheet and the side sheets, the end sheets having tape fasteners for tucking the end sheets when the base sheet and side sheets are properly positioned in the cargo chamber.

DETAILED DESCRIPTION OF THE INVENTION

Figure 1:
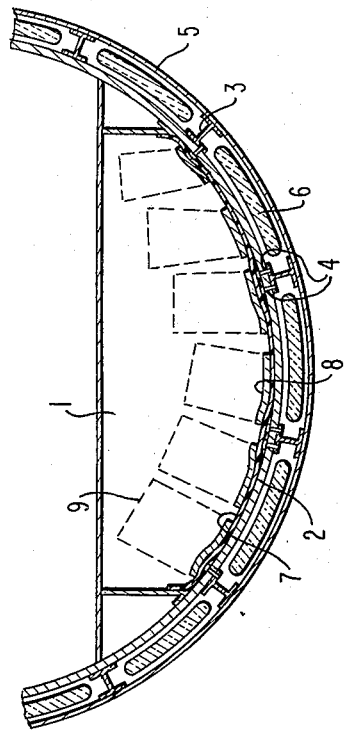
FIG. 1 is a sectional view of a conventional waterproof sheet for cargo chambers of aircraft.
Figure 2:
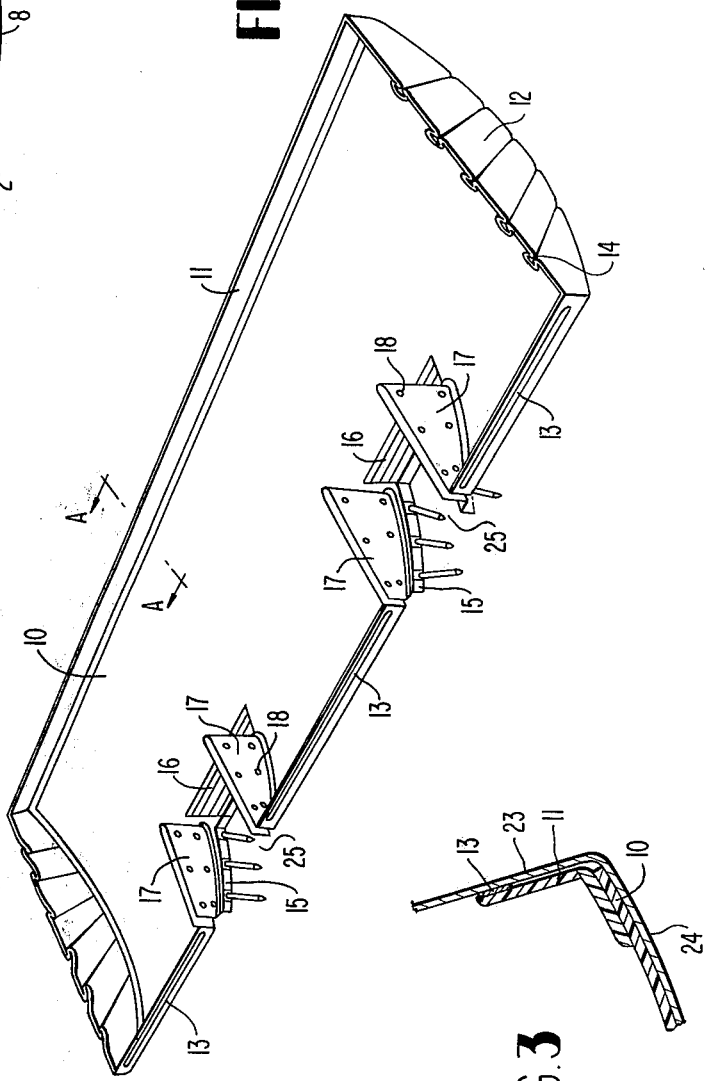
FIG. 2 is a perspective view of an a embodiment of a waterproof sheet of the present invention.

Referring now to FIG. 2 which shows the waterproof sheet of the invention attached to a cargo chamber of an airplane (the cargo chamber itself is not illustrated for the purpose of clarification of the figure), numeral 10 designates a base sheet having notched portions 25 corresponding to the doors of the airplane. The base sheet 10 is adapted to be spread, as seen from FIG. 3, over the floor 24 of the cargo chamber. The base sheet 10 is intended to prevent the water leaking out of the cargo, as well as water used in rinsing, from reaching the cargo chamber floor 24, and must stand up against any damaging force. The base sheet is therefore made of a wear-resistant, impact-resistant, water-and fireproof and, in addition, flexible material such as a synthetic rubber, for example, a urethane rubber sheet of a thickness of 3 mm.

Figure 3:
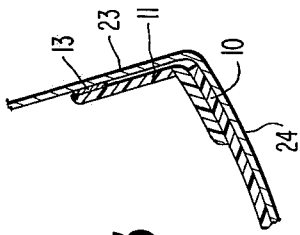
FIG. 3 is a sectional view taken along the line A—A of FIG. 2.

Numeral 11 designates side sheets provided along both longitudinal sides of the base sheet 10 and adapted to be attached to the wall 23 of the plane by means of tape fastener 13 as shown in FIG. 3. The side sheet 11 is made of a flexible material, for example, a polyvinyl chloride sheet of a thickness of 1 mm and is adapted to be tightly attached to the base sheet 10 as shown in FIG. 3 thereby preventing water used in rinsing from leaking during the rinsing operation. Numeral 12 designates end sheets provided at both longitudinal ends of the base sheet 10 and the side sheets 11. The end sheets 12 are adapted to be folded or tucked to complete the vessel-like shape of the entire waterproof sheet when it is attached to the cargo chamber as shown in FIG. 2. The tape fasteners 14 are for tacking the end sheets 11. The end sheets 12 are for preventing the water accumulated in the base sheet 10 from leaking out of the waterproof sheet and to prevent the water used in rinsing from getting out during the rinsing. When the waterproof sheet is detached, the end sheets 12 are flattened by stretching the tucks or pleats to extend from the base sheet 10 so that the entire waterproof sheet can be easily rolled up for storage. The end sheets 12 can be made of flexible material, such as a vinyl chloride sheet of a thickness of 1 mm.

Each of the tape fasteners 13 has two sides, one of which is secured to the side sheet 11 while the other side is secured to the wall 23 of the cargo chamber so that the waterproof sheet can be easily attached to the cargo chamber.

The tape fasteners 14 provided for tucking the end sheets 12 are positioned at one side of the end sheet 12. As described above, the tuck of the end sheet 12 is employed so that a vessel-like shape of the final waterproof sheet can be obtained.

Figure 4:
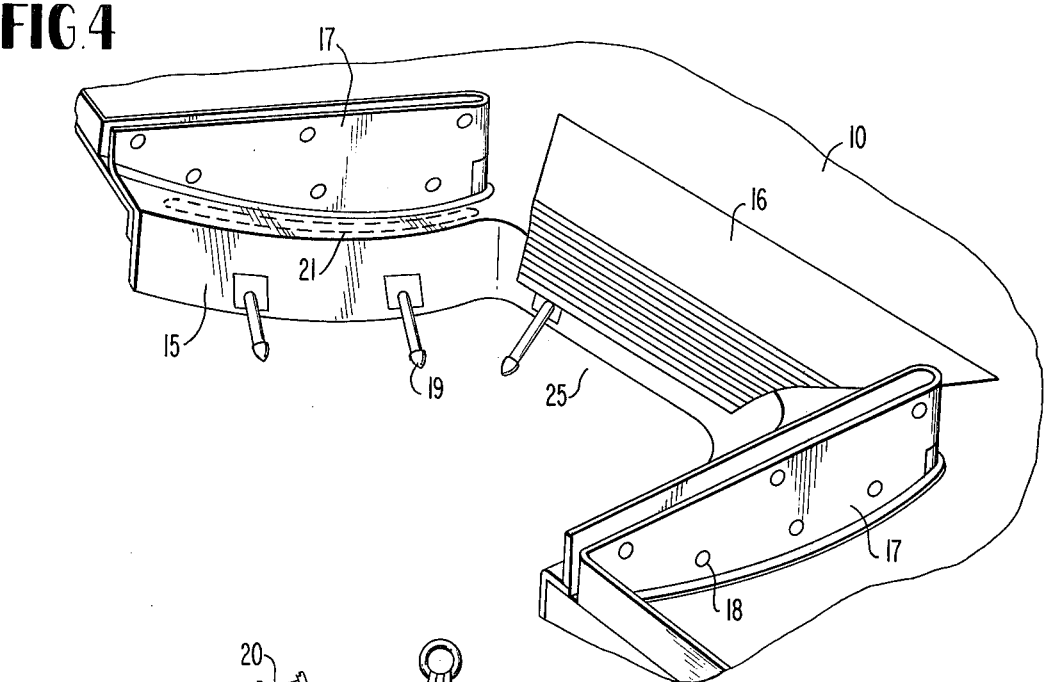
FIG. 4 shows the door of the aircraft in FIG. 2 on a larger scale.

Numeral 15 designates door sill flaps provided to surround the notched portions 25 of the base sheet 10. The door sill flaps 15 are foldable and are adapted to be suspended from the door opening, as seen in FIG. 4, during loading and unloading so as to prevent rainwater from getting behind the base sheet 10 even when cargo is handled in the rain. It can be understood that this flap is quite convenient also to prevent the water used in rinsing from getting behind the base sheet 10. The door sill flaps 15 can be made of the same material as the side sheets 11, and are provided with straps 19 adapated to co-operate with a belt 22 of the cargo chamber to lift up and fold the flaps 15 when the door is to be closed.

In order to protect the door sill flaps 15, door sill protectors 16 are provided at the notched portions 25 of the base sheet 10. The door sill protector 16 protects the door sill flaps 15 against the cargo being handled and against a belt loader used for loading, and can be made of a wear-and impact-resistant material, such as a synthetic rubber as in the case of the base sheet 10. In order to facilitate the bending of the protector 16, the portion of the protector 16 corresponding to the door sill flaps 15 comprises a plurality of parallel belts.

Figure 5:
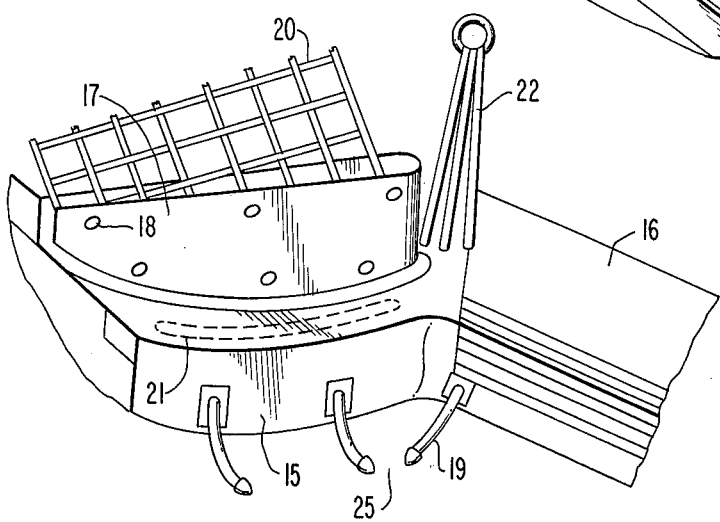
FIG. 5 is perspective view of the door of the aircraft when the door is opened for loading and unloading.
Figure 6:
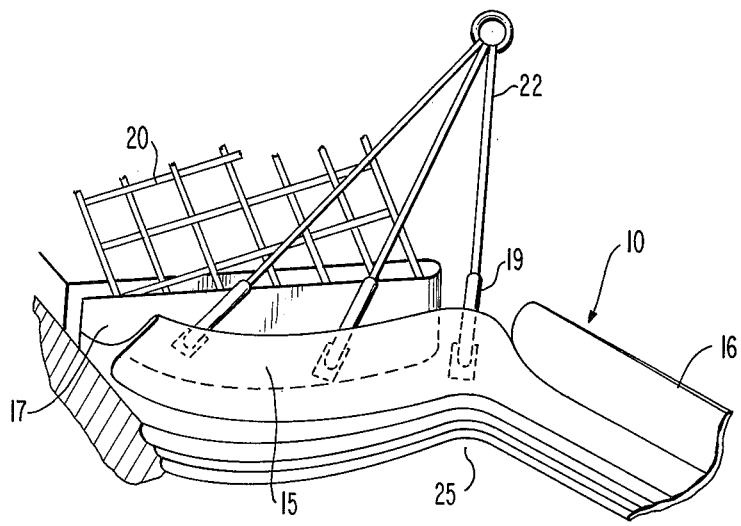
FIG. 6 is perspective view of the door of the aircraft folded back by a door sill flap and belt when the door is to be closed.

On both sides of the notched portion 25 of the base sheet 10, a pair of door net covers 17, which comprise snap fasteners 18 adapted to hold a door net 20, is provided. The door net cover 17 prevents water from leaking out through the side portions of the notched portion 25, and can be made of the same material as the side sheet 11. The door net cover 17, however, can be dispensed with, if desired for simplification of the entire wateproof sheet. In order to secure the door sill flaps 15, tape fasteners 21, as shown in FIGS. 4 and 5, are provided.

The attaching of the waterproof sheet to the cargo chamber is conducted in the following manner. At first, the rolled up waterproof sheet is placed in the cargo chamber. The sheet is then spread so that the base sheet 10 lies on the floor 24 of the chamber as seen from FIG. 2. The door sill flaps 15 are then pulled out to hang from the door portions. Subsequently, side sheets 11 are secured to the wall 23 of the chamber by means of the tape fasteners 13, and the end sheets 12 are bent for erection as shown in FIG. 2. If necessary, the door net 20 is secured to the door net cover 17 by means of snap fasteners 18.

As described above, the waterproof sheet of the present invention has remarkable and advantageous features, some of which are summarized as follows.

1. The waterproof sheet is easy to attach to and detach from the cargo chamber due to the complementary tape fasteners, one of which is secured to the wall of the cargo chamber while the other is secured to the side sheets.

2. Water leaking from the cargo, as well as water used in rinsing, can not leak out of the waterproof sheet due to the provision of the side sheets and end sheets to the base sheet.

3. Rainwater can not get into the space between the base sheet and the aircraft body due to the door sill flaps, even when cargo handling is done in a hard rain.

4. The entire sheet can be easily spread or rolled up for storage due to the foldable or tuckable end sheets and the flexible material of the end sheets and side sheets.

5. The sheet is less likely to be damaged or wrinkled during the handling of the cargo and can be used repeatedly. Namely, the sheet can be kept installed for repeated use except in times of periodic inspections, which provides a higher transportation efficiency.

While the invention has been described in detail and with reference to specific embodiments thereof, it will be apparent to one skilled in the art that various changes and modifications can be made therein without departing from the spirit and scope thereof.

What is claimed is:

1. A waterproof sheet for cargo chambers of aircraft comprising a base sheet adapted to lie on the floor of said chamber and having notched portions at positions corresponding to the doors of said chamber; door sill flaps provided to said base sheet around said notched portions and adapted to be folded up and down at the time of opening and closing of said door; door sill protectors provided to said base sheet at said notched portions for protecting said door sill flaps; side sheets provided at the longitudinal sides of said base sheet and having tape fasteners for securing said base sheet to the wall of said chamber; and end sheets provided at the longitudinal ends of said base sheet and said side sheets and having tape fasteners for tucking the end sheets when said base sheet and side sheets are positioned properly in said chamber.

2. The waterproof sheet of claim 1, wherein said base sheet and said door sill protectors are a wear-resistant, impact-resistant, water-and fire proof flexible material.

3. The waterproof sheet of claim 2, wherein said base sheet and said door sill protectors are made of a urethane rubber.

4. The waterproof sheet of claim 1, wherein said door flaps, said side sheet and said end sheets are a flexible material.

5. The waterproof sheet of claim 4, wherein said door flaps, said side sheet and said end sheets are made of polyvinyl chloride.

6. The waterproof sheet of claim 1, including straps attached to said door sill flaps to fold up said door sill flaps at the time of closing of said door.

7. The waterproof sheet of claim 1, wherein the portion of said door sill protectors corresponding to said door sill flaps comprises a plurality of parallel belts.

* * * * *